(12) United States Patent
Wang et al.

(10) Patent No.: US 12,105,563 B2
(45) Date of Patent: Oct. 1, 2024

(54) CONTROL METHOD AND DEVICE, AND COMPUTER-READABLE STORAGE MEDIUM CONTROLLING FUNCTION OF INTERACTION INTERFACE OF ELECTRONIC DEVICE

(71) Applicant: Lenovo (Beijing) Limited, Beijing (CN)

(72) Inventors: Helai Wang, Beijing (CN); Anyu Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 265 days.

(21) Appl. No.: 17/550,227

(22) Filed: Dec. 14, 2021

(65) Prior Publication Data

US 2022/0308637 A1 Sep. 29, 2022

(30) Foreign Application Priority Data

Mar. 26, 2021 (CN) .......................... 202110326465.6

(51) Int. Cl.
*G06F 1/16* (2006.01)
(52) U.S. Cl.
CPC .......... *G06F 1/1677* (2013.01); *G06F 1/1618* (2013.01); *G06F 2200/1637* (2013.01)
(58) Field of Classification Search
CPC ........................................... G06T 2207/30208
See application file for complete search history.

(56) References Cited

U.S. PATENT DOCUMENTS

| | | | |
|---|---|---|---|
| 2016/0048363 A1* | 2/2016 | North | G06F 1/1677 345/1.1 |
| 2018/0275724 A1* | 9/2018 | Lin | G06F 1/22 |
| 2018/0285051 A1* | 10/2018 | Cawley | G06F 21/606 |
| 2020/0150836 A1* | 5/2020 | Penha | G06F 3/0488 |

FOREIGN PATENT DOCUMENTS

| | | |
|---|---|---|
| CN | 105653071 A | 6/2016 |
| CN | 105786107 A | 7/2016 |

* cited by examiner

*Primary Examiner* — Henry Tsai
*Assistant Examiner* — Juanito C Borromeo
(74) *Attorney, Agent, or Firm* — ANOVA LAW GROUP, PLLC

(57) ABSTRACT

The present disclosure provides a control method applied to an electronic device. The electronic device includes a first human-machine interaction area and a second human-machine interaction area, the first human-machine interaction area and the second human-machine interaction area being movable relative to each other. The method includes obtaining attitude information of the electronic device in response to determining that the electronic device is connected to an external display device; determining a corresponding preset strategy based on the attitude information, the preset strategy including one of disabling a first function of the first human-machine interaction area, disabling a second function of the second human-machine interaction area, and combining the first human-machine interaction area and the second human-machine interaction area; determining a target interaction area based on the preset strategy, and identifying the target interaction area as an input control area; and receiving an input operation through the input control area.

20 Claims, 12 Drawing Sheets

CONTROL METHOD AND DEVICE, AND COMPUTER-READABLE STORAGE MEDIUM CONTROLLING FUNCTION OF INTERACTION INTERFACE OF ELECTRONIC DEVICE

CROSS-REFERENCES TO RELATED APPLICATION

This application claims priority to Chinese Patent Application No. 202110326465.6, filed on Mar. 26, 2021, the entire content of which is incorporated herein by reference.

FIELD OF TECHNOLOGY

The present disclosure relates to the fields of computer and information processing and, more specifically, to a control method and device, and a computer-readable storage medium.

BACKGROUND

With the rapid development of science and technology, the size of notebook computers is becoming smaller, while the notebook computers are becoming more powerful. Therefore, the application scenarios of notebook computers are increasing day by day. A notebook computer is a combination of a host and a display screen. In one example, the notebook computer can implement the functions of the host and the display screen. In another example, the notebook computer can also be connected to an external display screen. The display function can be implemented through the external display screen, and the host function can be implemented through the notebook computer.

In order to increase the dot pitch of the display screen, increase the resolution of the display screen, improve the picture quality and other display effects, the notebook computer can be used with an external display screen, and the display interface can be displayed on the external display screen through the "display desktop only on 2" function. At this time, the notebook computer implements the function of the host, and the external display screen implements the display function. In this example, the notebook computer needs to be in a normal open position, but in order to avoid blocking the external display screen, the notebook computer is generally laid flat or reversely snapped on the desktop. When the notebook computer is laid flat, it takes up more real estate on the desk surface, making the notebook computer difficult to operate. When the notebook computer is reversely snapped, it is easy to accidentally touch the side that touches the desktop. In addition, in any of the scenarios described above, the notebook computer is inconvenient to use, which greatly reduces user experience.

BRIEF SUMMARY OF THE DISCLOSURE

One aspect of the present disclosure provides a control method applied to an electronic device. The electronic device includes a first human-machine interaction area and a second human-machine interaction area, the first human-machine interaction area and the second human-machine interaction area being movable relative to each other. The method includes obtaining attitude information of the electronic device in response to determining that the electronic device is connected to an external display device; determining a corresponding preset strategy based on the attitude information, the preset strategy including one of disabling a first function of the first human-machine interaction area, disabling a second function of the second human-machine interaction area, and combining the first human-machine interaction area and the second human-machine interaction area; determining a target interaction area based on the preset strategy, and identifying the target interaction area as an input control area; and receiving an input operation through the input control area.

Another aspect of the present disclosure provides an electronic device including at least a first human-machine interaction area and a second human-machine interaction area, the first human-machine interaction area and the second human-machine interaction area being movable relative to each other. The electronic device includes a processor; and a memory storing program instructions that, when being executed by the processor, cause the processor to: obtain attitude information of the electronic device in response to determining that the electronic device is connected to an external display device; determine a corresponding strategy based on the attitude information, the strategy including one of disabling a first function of the first human-machine interaction area, disabling a second function of the second human-machine interaction area, and combining the first human-machine interaction area and the second human-machine interaction area; determine a target interaction area based on the strategy, and identify the target interaction area as an input control area; and receive an input operation through the input control area.

Another aspect of the present disclosure provides a computer-readable storage medium storing program instructions that, when being executed by a processor, cause the processor to: obtain attitude information of the electronic device in response to determining that the electronic device is connected to an external display device; determine a corresponding strategy based on the attitude information, the strategy including one of disabling a first function of the first human-machine interaction area, disabling a second function of the second human-machine interaction area, and combining the first human-machine interaction area and the second human-machine interaction area; determine a target interaction area based on the strategy, and identify the target interaction area as an input control area; and receive an input operation through the input control area.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the following descriptions, the phrase "some embodiments" describe a subset of all possible embodiments. However, it may be understood that the phrase "some embodiments" may be the same subset or different subsets of all the possible embodiments, and may be combined with each other without conflict.

Terms of "first\second\third" of embodiments of the present disclosure only distinguish similar objects, and does not represent a specific order of objects. The specific order or sequence of the "first\second\third" is allowed to be interchangeable. The objects distinguished by "first\second\third" are interchangeable under an appropriate situation. As such, embodiments of the present disclosure described here may describe sequence embodiments in addition to the drawings or described sequences.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure.

Figure 1:
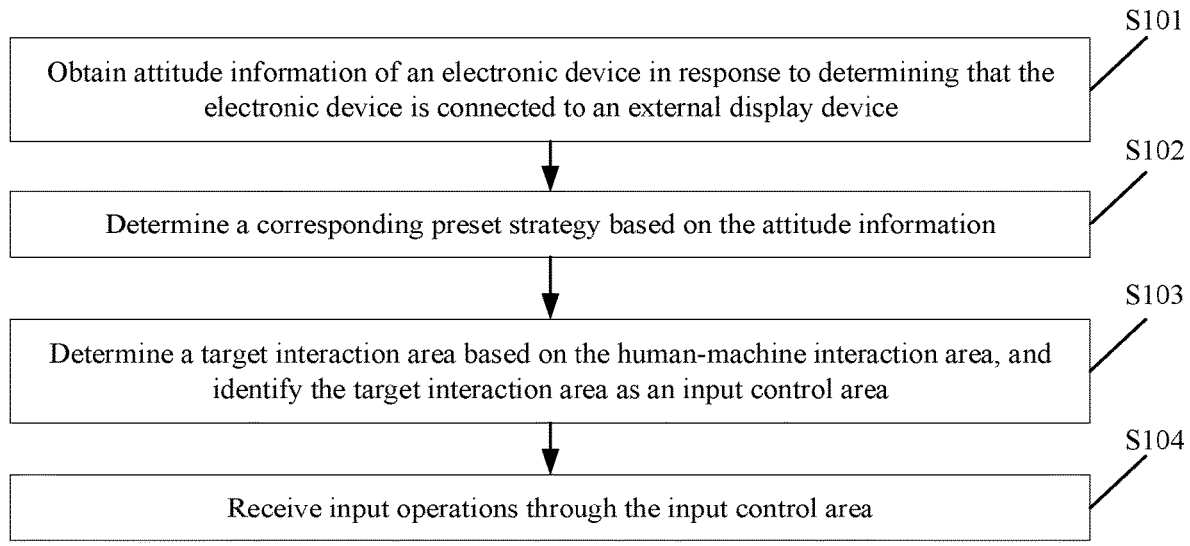
FIG. 1 is a flowchart of a control method according to an embodiment of the present disclosure.

Embodiments of the present disclosure provide a control method, which can be implemented by a computer program. When the computer program is executed, each process in the control method provided in the embodiments of the present disclosure can be completed. In some embodiments, the computer program can be executed by a processor in an electronic device. FIG. 1 is a flowchart of a control method according to an embodiment of the present disclosure. The method will be described in detail below.

S101, obtaining attitude information of the electronic device in response to determining that the electronic device is connected to an external display device.

In some embodiments, the external display device may include an LCD monitor, a projector, etc. Further, whether the electronic device is connected to the external display device may be determined by a state of at least one of the video graphics array (VGA) interface, the high-definition multimedia interface (HDMI), and the universal serial bus (USB) interface of the electronic device. When it is determined that the electronic device is connected to an external display device, the attitude information of the electronic device can be obtained. When it is determined that the electronic device is not connected to an external display device, the process can be ended.

Figure 2A:
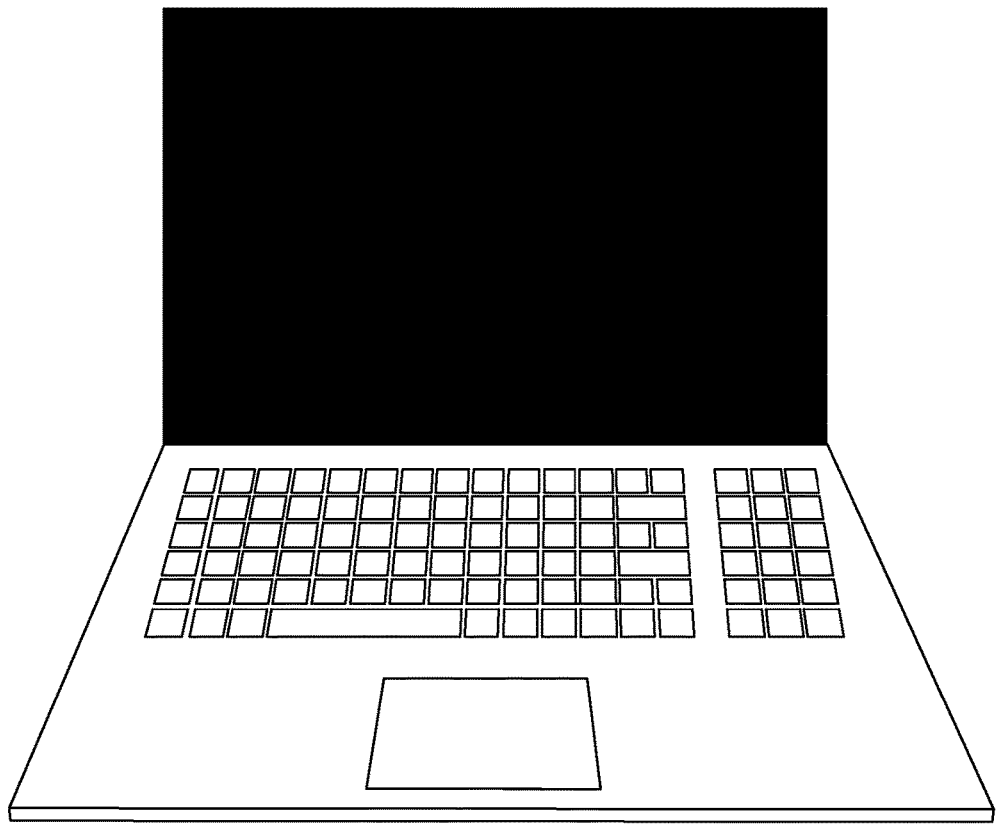
FIG. 2A is a schematic diagram of an electronic device in an open position according to an embodiment of the present disclosure.
Figure 2B:
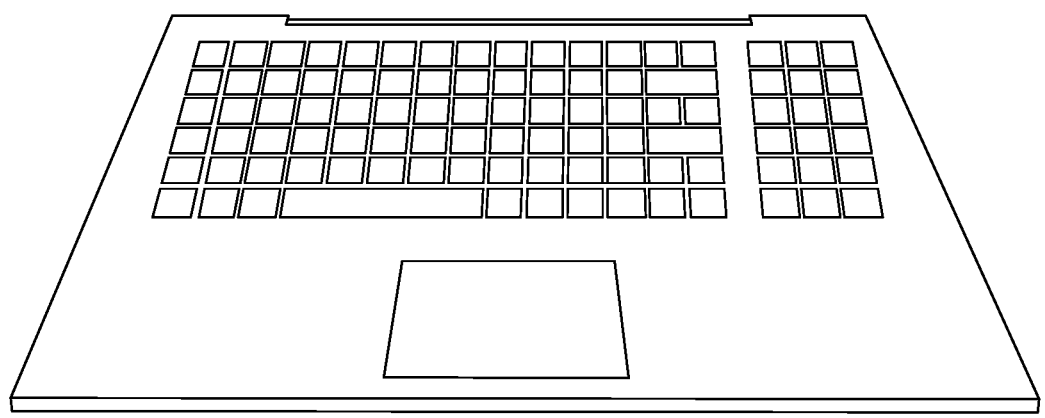
FIG. 2B is a schematic diagram of the electronic device in a reverse snapped attitude according to an embodiment of the present disclosure.
Figure 2C:
FIG. 2C is a schematic diagram of the electronic device in another reverse snapped attitude according to an embodiment of the present disclosure.
Figure 2D:
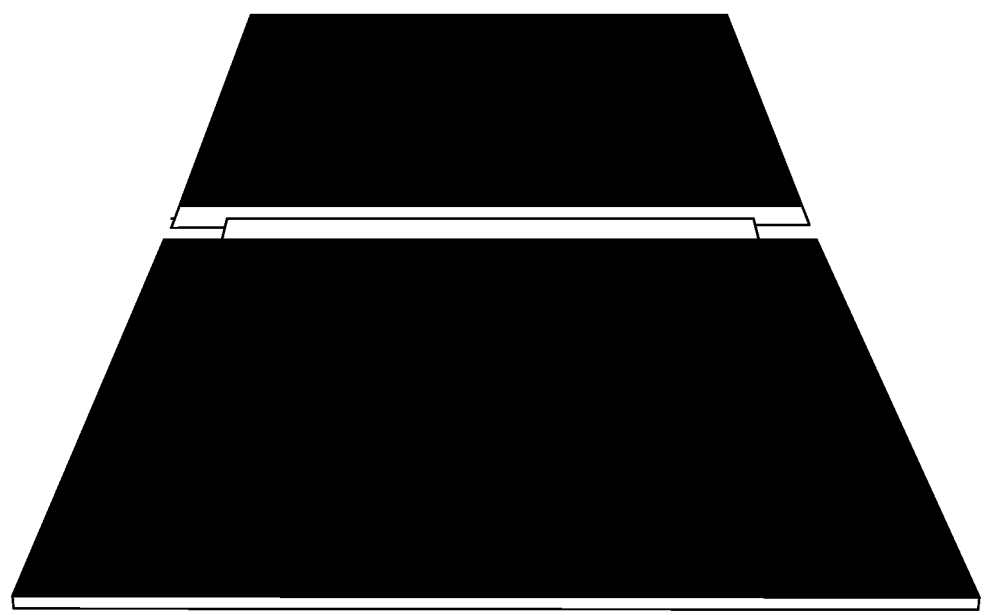
FIG. 2D is a schematic diagram of the electronic device in a laid flat attitude according to an embodiment of the present disclosure.
Figure 2E:
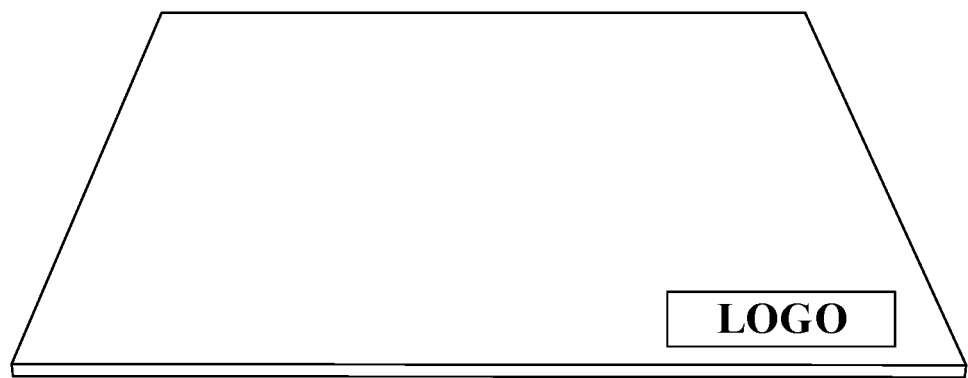
FIG. 2E is a schematic diagram of the electronic device in a forward snapped attitude according to an embodiment of the present disclosure.

The electronic device may include at least a first human-machine interaction area and a second human-machine interaction area. In some embodiments, the first human-machine interaction area and the second human-machine interaction area may move relatively. In some embodiments, the first human-machine interaction area and the second human-machine interaction area may be rotated within an angle threshold, where the angle threshold may be 360°, 270°, 180°, etc. The electronic device may be a smart phone, a notebook computer, a wearable electronic device, etc. Take a notebook computer as an example, the first human-machine interaction area may be positioned on a C-side of the notebook computer, and the second human-machine interaction area may be positioned on a B-side of the notebook computer. Still take a notebook computer as an example, the attitude information of the electronic device may include an open attitude as shown in FIG. 2A, a reverse snapped attitude where the B-side faces a support as shown in FIG. 2B, a reverse snapped attitude where the C-side faces the support as shown in FIG. 2C, a laid flat attitude as shown in FIG. 2D, and a forward snapped attitude where a D-side faces the support as shown in FIG. 2E. The gravity sensor in the electronic device may be used to obtain the position information such as the orientation and angle of the first human-machine interaction area and the second human-machine interaction area in real time. Based on this, the attitude information of the can be obtained.

S102, determining a corresponding preset strategy based on the attitude information.

The preset strategy may be one of the strategies of disabling a first function of the first human-machine interaction area, disabling a second function of the second human-machine interaction area, and combining the first human-machine interaction area and the second human-machine interaction area.

The embodiments of the present disclosure take the first human-machine interaction area being positioned on the C-side of the notebook computer and the second human-machine interaction area being positioned on the B-side of the notebook computer as an example. Referring to FIG. 2B, when the notebook computer is in the reverse snapped attitude where the B-side faces the support, the B-side of the notebook computer may be in contact with the support such as the desktop. At this time, the corresponding preset strategy may be determined as to disable the function of the B-side of the notebook computer. Referring to FIG. 2C, when the notebook computer is in the reverse snapped attitude where C-side faces the support, the C-side of the notebook computer may be in contact with the support such as the desktop. At this time, the corresponding preset strategy may be determined as to disable the function of the C-side of the notebook computer. Referring to FIG. 2D, when the notebook computer is in the laid flat attitude, in order to make full use of the B-side and C-side of the notebook computer, at this time, the corresponding preset strategy may be determined to combine the B-side and the C-side of the notebook computer to generate a relatively large human-machine interaction area.

S103, forming a target interaction area based on the preset strategy, and determining the target interaction area as an input control area.

There may be three situations when implementing the process at S103.

In the first situation, when the preset strategy determined in the process at S102 is to disable the first function of the first human-machine interaction area, the second human-machine interaction area may be determined as the target interaction area.

In the second situation, when the preset strategy determined in the process at S102 is to disable the second function of the second human-machine interaction area, the first human-machine interaction area may be determined as the target interaction area.

In the third situation, when the preset strategy determined in the process at S102 is to combine the first human-machine interaction area and the second human-machine interaction area to form a combined interaction area, the combined interaction area may be determined as the target interaction area.

Further, when the target interaction area is a touch display area and does not include an input control component, that is, when the target area is a touch display area that does not include a physical keyboard, a virtual input area may be determined on the target interaction area, which is equivalent to determining a virtual keyboard area and determining the virtual input area as the input control area. When the target interaction area includes the input control component, the area where the input control component is positioned may be determined as the input control area.

S104, receiving an input operation through the input control area.

In some embodiments, the input operation may include a typing operation, a clicking operation, a zoom-in operation, and a zoom-out operation on the display interface, and a movement operation of a control mark, etc.

The embodiment of the present disclosure provides a control method, which can be applied to an electronic device. The electronic device may include at least a first human-machine interaction area and a second human-machine interaction area that can move relative each other. When it is determined that the electronic device is connected to an external display device, the attitude information of the electronic device may be obtained. Further, the corresponding preset strategy may be determined based on the attitude information. In some embodiments, the preset strategy may be to disable the first function of the first human-machine interaction area, or disable the second function of the second human-machine interaction area, or combine the first human-machine interaction area and the second human-machine interaction area. Subsequently, based on the determined preset strategy, a target interaction area can be formed in the area where the function is not disabled, and the target interaction area can be determined as the input control area. Finally, the input operation for the electronic device can be received through the input control area. In this way, when the electronic device is connected to an external display device, the electronic device can be controlled through the input control area, and the first function or the second function can be disabled to prevent accidental touches in the first human-machine interaction area or the second human-machine interaction area. Further, the input control area can be increased by combining the first human-machine interaction area and the second human-machine interaction area, thereby improving the operation convenience, which further improves work efficiency and enhances user experience.

Figure 3:
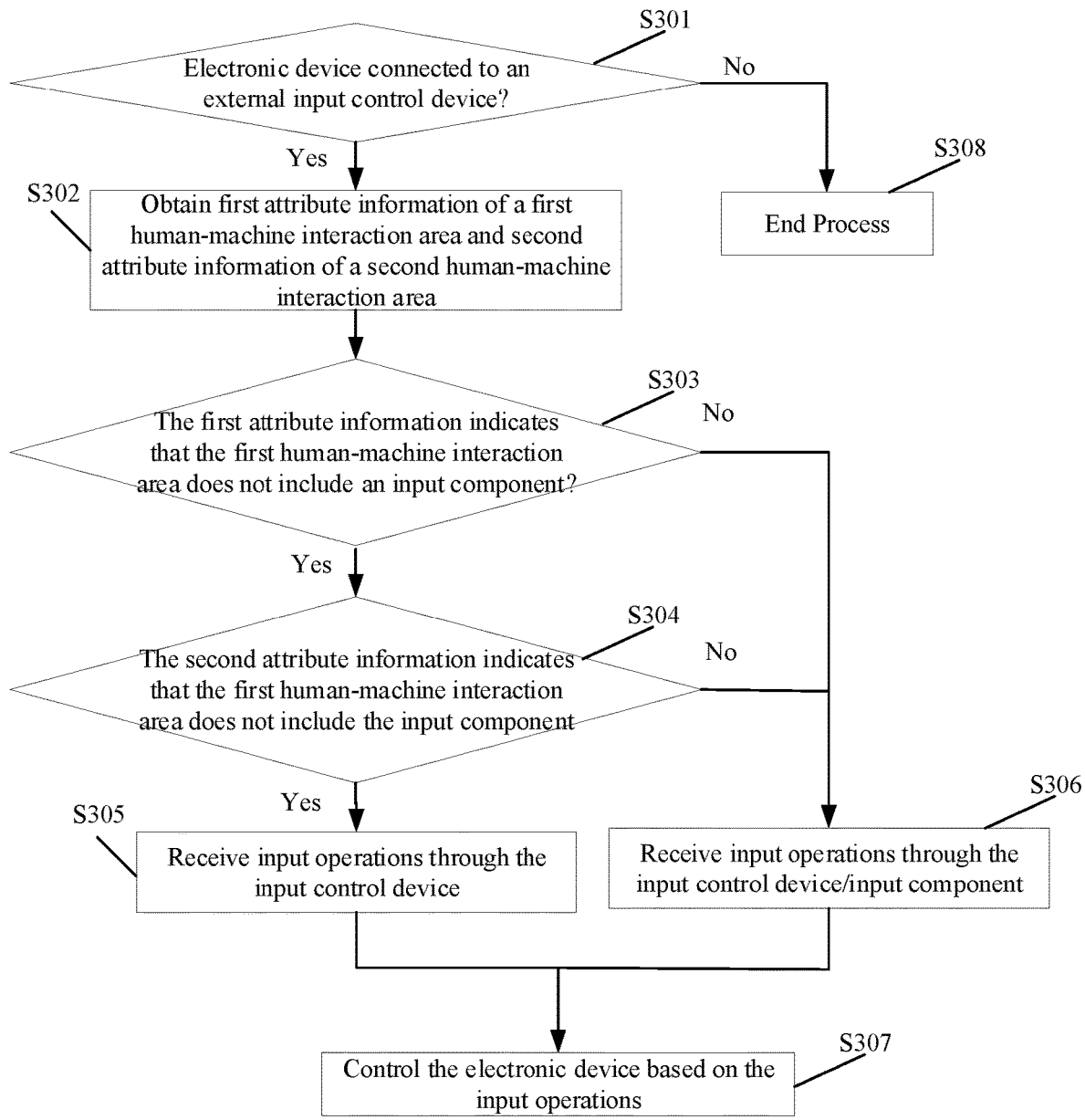
FIG. 3 is another flowchart of the control method according to an embodiment of the present disclosure.

In some embodiments, before the process at S101 is performed, as shown in FIG. 3, the following processes of S301 to S308 may also be performed.

S301, determining whether the electronic device is connected to an external input control device.

The external input control device may include an external keyboard, an external mouse, an external handle, etc. When the electronic device is connected to an external input control device, the input operation may be received through the external input control device, and the process at S302 may be performed. When the electronic device is not connected to an external input control device, the electronic device may only receive input operations through its own input module, and the process at S308 may be performed, that is, the process may be ended.

S302, obtaining first attribute information of the first human-machine interaction area and second attribute information of the second human-machine interaction area.

In some embodiments, the first attribute information may include at least attribute information of the components included in the first human-machine interaction area. For example, the components may be the touch screen components, keyboard components, touchpad components, etc. Similarly, the second attribute information may include at least attribute information of the components included in the second human-machine interaction area.

S303, determining whether the first attribute information indicates that the first human-machine interaction area does not include an input component.

The first attribute information may be analyzed to obtain an analysis result. When the analysis result indicates that the first attribute information does not include the attribute information of the input component, it may indicate that the first human-machine interaction area does not include the input component, and the process at S304 can be performed to continue to determine whether the second human-machine interaction area includes the input component. When the analysis result indicates that the first attribute information includes the attribute information of the input component, it may indicate that the first human-machine interaction area includes the input component, the process at S306 can be performed, and the input operation can be received through the external input control device and/or the electronic device's input component.

S304, determining whether the second attribute information indicates that the second human-machine interaction area does not include the input component.

The second attribute information may be analyzed to obtain an analysis result. When the analysis result indicates that the second attribute information does not include the attribute information of the input component, it may indicate that the second human-machine interaction area does not include the input component, the process at S305 can be performed, and the input operation can be received through the input control device. When the analysis result indicates that the second attribute information includes the attribute information of the input component, it may indicate that the second human-machine interaction area includes the input component, the process at S306 can be performed, and the input operation can be received through the external input control device and/or the electronic device's input control device.

S305, receiving an input operation through the input control device.

In some embodiments, the corresponding input operations may be received based on the type of the input control device. For example, when the input control device is a keyboard, the typing operation can be received through the keyboard; and when the input control device is a mouse, the clicking and moving operations can be received through the mouse.

S306, receiving the input operation through the input control device and/or the input component.

In some embodiments, the electronic device may be connected to the input control device, but may also include its own input component. At this time, the input operations may be received through the input control device, the input component, or the cooperation of the input control device and the input component.

S307, controlling the electronic device based on the input operation.

S308, end process.

Through the processes of S301 to S308, whether the electronic device is connected to an external input control device can be first determined. When it is determined that the electronic device is connected to an external input control device, it may indicate that the input operation can be received through the external input control device. Based on this, the first attribute information of the first human-machine interaction area and the second attribute information of the second human-machine interaction area can also be obtained. Then based on the first attribute information, whether the first human-machine interaction area includes the input component can be determined. Further, based on the second attribute information, whether the second human-machine interaction area includes the input component can be determined. When the determination result indicates that neither the first human-machine interaction area nor the second human-machine interaction area includes the input component, the input operation can be received through the input control device. When the determination result indicates that the first human-machine interaction area or the second human-machine interaction area include the input component, the input operation can be received through the input control device and/or the input component, thereby improving the scalability and flexibility of the electronic device, and improving work efficiency.

Figure 4:
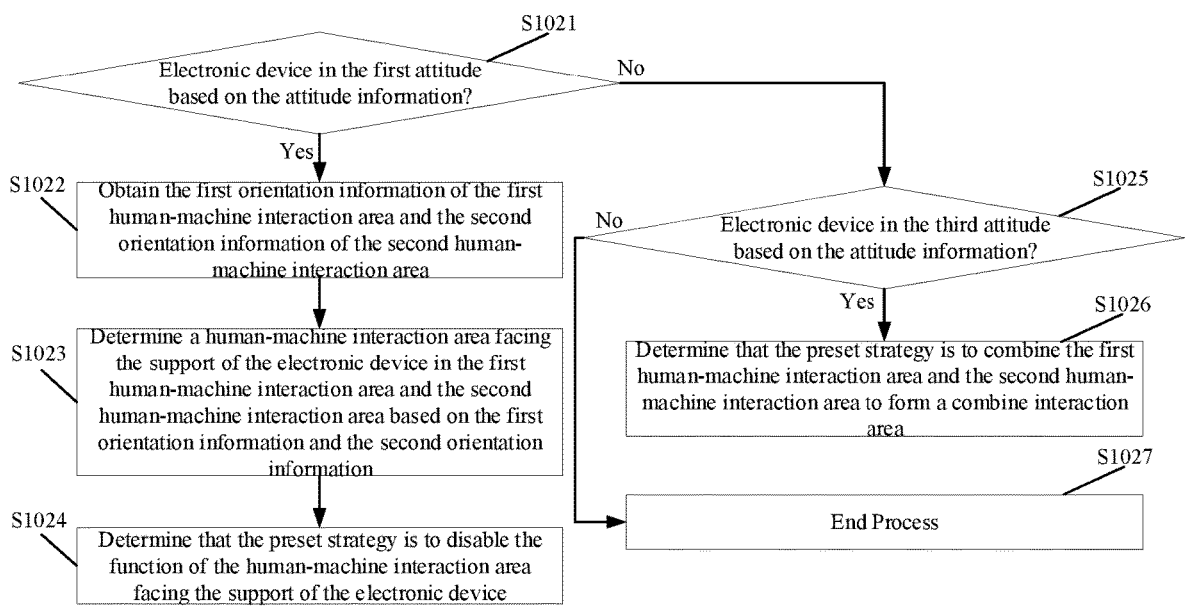
FIG. 4 is a flowchart of a method for determining a preset strategy according to an embodiment of the present disclosure.

In some embodiments, as shown in FIG. 4, the process at S102 may be implemented through the following processes S1021 to S1027.

S1021, determining whether the electronic device is in a first attitude based on the attitude information.

In some embodiments, when the electronic device is in the first attitude, a first plane where the first human-machine interaction area is positioned may be reversely snapped with a second plane where the second human-machine interaction area is positioned, such as the configuration shown in FIG. 2B or FIG. 2C.

In the embodiments of the present disclosure, the attitude information may be obtained through a gravity sensor. When it is determined that the electronic device is in the first attitude based on the attitude information, the process at S1022 may be performed to further obtain the orientation information of the two human-machine interaction areas. When it is determined that the electronic device is not in the first attitude based on the attitude information, the process at S1025 may be performed to continue to determine whether the electronic device is in a third attitude.

S1022, obtaining first orientation information of the first human-machine interaction area and second orientation information of the second human-machine interaction area.

In some embodiments, the first orientation information may include the orientation direction of the first human-machine interaction area, and the second orientation information may include the orientation direction of the second human-machine interaction area. In the embodiments of the present disclosure, a gravity sensor may be installed in the electronic device, and the gravity sensor may be configured to obtain the orientation information of each human-machine interaction area. Therefore, by reading the data in the gravity sensor and analyzing the data, the first orientation information of the first human-machine interaction area and the second orientation information of the second human-machine interaction area can be obtained.

S1023, determining the human-machine interaction area facing the support of the electronic device in the first human-machine interaction area and the second human-machine interaction area based on the first orientation information and the second orientation information.

The support of the electronic device may be a desktop, an electronic device bracket, etc. The support of the electronic device is generally under the electronic device, and the orientation information can be orthogonally decomposed based on the horizontal and vertical directions. When the decomposed orientation information in the vertical direction indicates a downward direction, then the human-machine interaction interface corresponding to the orientation information may be considered as facing the support of the electronic device. When the decomposed orientation information in the vertical direction indicates an upward direction, then the human-machine interaction interface corresponding to the orientation information may be considered as facing away from the support of the electronic device.

In the embodiments of the present disclosure, when the decomposed orientation information of the first orientation information in the vertical direction indicates a downward direction, the first human-machine interaction area may be determined to be the human-machine interaction area facing the support of the electronic device. When the decomposed orientation information of the second orientation information in the vertical direction indicates a downward direction, the second human-machine interaction area may be determined to be the human-machine interaction area facing the support of the electronic device S1024, determining that the preset strategy is to disable the function of the human-machine interaction area facing the support of the electronic device.

In some embodiments, the preset strategy may include the following two situations.

In the first situation, the second human-machine interaction area may have a touch function. When the human-machine interaction area facing the support of the electronic device is the second human-machine interaction area, the second function of the second human-machine interaction area may be disabled.

In implementation, an embedded controller (EC) may be used to disable the touch function of the second human-machine interaction area, thereby avoiding accidental touches in the second human-machine interaction area.

In the second situation, when the human-machine interaction area facing the support of the human-machine interaction area is the first human-machine interaction area, the first function of the first human-machine interaction area may be disabled.

In implementation, the EC may also be used to disable the touch function of the first human-machine interaction area, thereby avoiding accidental touches in the first human-machine interaction area.

S1025, determining whether the electronic device is in a third attitude based on the attitude information.

In some embodiments, both the first human-machine interaction area and the second human-machine interaction area may be touch display screens. When the electronic device is in the third attitude, the first plane where the first human-machine interaction area is positioned may be on the same plane as the second plane of the second human-machine interaction area, and both the first plane and the second plane may face away from the support of the electronic device, such as the configuration shown in FIG. 2D.

In the embodiments of the present disclosure, the attitude information may include plane information where the human-machine interaction area is positioned. In some embodiments, the plane where the first human-machine interaction area is positioned may be the first plane, and the plane where the second human-machine interaction area is positioned may be the second plane. When first plane information and second plane information indicate that the first plane and the second plane are in the same plane, the first orientation information and the second orientation information may continue to be orthogonally decomposed. When the decomposed orientation of the first orientation information and the second orientation in the vertical direction indicates an upward direction, it may indicate that the first plane and the second plane are both facing away from the support of the electronic device. That is, the electronic device may be in the third attitude. At this time, the process at S1026 may be performed to directly determine the preset strategy in the third attitude. When it is determined that the electronic device in not in the third attitude based on the attitude information, the process at S1027 may be performed, that is, the process may be ended.

S1026, determining that the preset strategy is to combine the first human-machine interaction area and the second human-machine interaction area to form a combined interaction area.

When the process at S1026 is implemented, the first human-machine interaction area and the second human-machine interaction area may be combined through the EC, such that the two human-machine interaction areas can form an integral interaction area, that is, a combined interaction area.

S1027, end process.

Through the processes of S1021 to S1027, whether the electronic device is in the first attitude or the third attitude can be determined based on the attitude information. When the electronic device is in the first attitude, the human-machine interaction area facing the support of the electronic device may be further determined, and the function corresponding to the human-machine interaction area may be disabled, thereby avoiding accidental touches of the human-machine interaction area of the electronic device. When the electronic device is in the third attitude, the first human-machine interaction area and the second human-machine interaction area may be combined to form a relatively large combined human-machine interaction area, thereby increasing the space for subsequent input operations.

Figure 5:
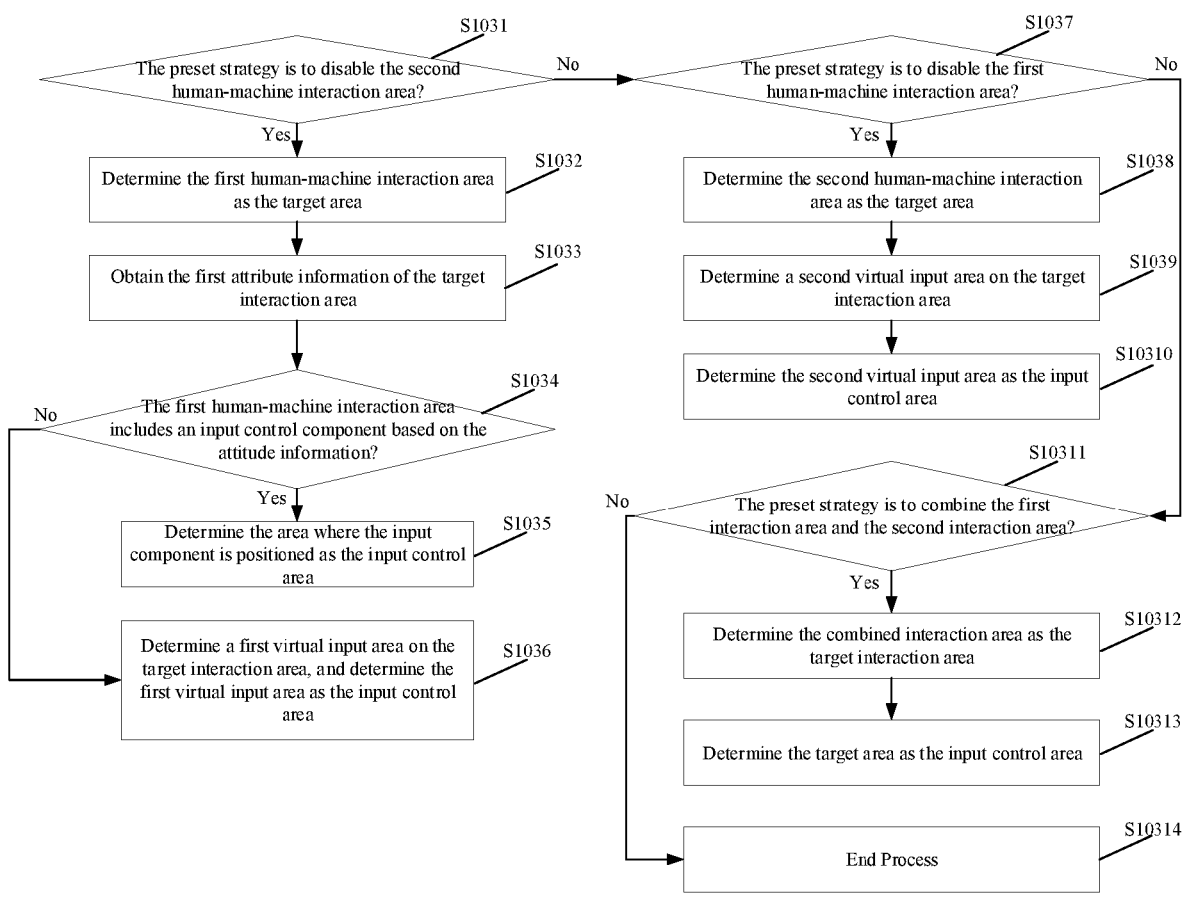
FIG. 5 is a flowchart of a method for determining an input control area according to an embodiment of the present disclosure.

In some embodiments, as shown in FIG. 5, the process at S103 may be implemented through the following processes S1031 to S10314.

S1031, determining whether the preset strategy is to disable the second human-machine interaction area.

When it is determined in the process at S102 that the preset strategy is to disable the second human-machine interaction area, the process at S1032 may be performed to operation on the first human-machine interaction area. When it is determined in the process at S102 that the preset strategy is not to disable the second human-machine interaction area, the process at S1037 may be performed to continue to determine whether the preset strategy is to disable the first human-machine interaction area.

S1032, determining the first human-machine interaction area as the target area.

S1033, obtaining the first attribute information of the target interaction area.

In some embodiments, the first attribute information may include at least attribute information of the components included in the first human-machine interaction area. For example, the components may be the touch screen components, keyboard components, touchpad components, etc.

S1034, determining whether the first human-machine interaction area includes an input control component based on the first attribute information.

When the first attribute information includes the attribute information of the input component, it may indicate that the first human-machine interaction area includes the input control component and the process at S1035 may be performed. When the first attribute information does not include the attribute information of the input component, it may indicate that the first human-machine interaction area does not include the input control component, and the process at S1036 may be performed.

S1035, determining the area where the input control component is positioned as the input control area.

In some embodiments, when the input control component is included in the first human-machine interaction area, it may indicate that the electronic device has its own input control component, and the electronic device may be a notebook computer with a keyboard and a touchpad on the C-side.

S1036, determining a first virtual input area on the target interaction area, and determining the first virtual input area as the input control area.

In some embodiments, the first virtual input area may include a virtual keyboard area, a virtual touchpad area, etc. the virtual keyboard area and the virtual touchpad area may be arranged horizontally or vertically, and may also be arranged based on user-defined arrangements. The above arrangements are examples, and the arrangement of the first virtual input area is not limited in the embodiments of the present disclosure. The first virtual input area may be determined on the target area, and the first virtual input area may be determined as an input control area for receiving input operations.

S1037, determining whether the preset strategy is to disable the first human-machine interaction area.

When it is determined in the process at S102 that the preset strategy is to disable the first human-machine interaction area, the process at S1038 may be performed to continue to operate on the second human-machine interaction area. When it is determined in the process at S102 that the preset strategy is not to disable the first human-machine interaction area, the process at S10311 may be performed to continue to determine whether the preset strategy is to combine the first human-machine interaction area and the second human-machine interaction area.

S1038, determining the second human-machine interaction area as the target area.

S1039, determining a second virtual input area on the target interaction area.

The implementation of the process at S1039 is the same as the implementation of the process at S1036 of determining the first virtual input area on the target interaction area. When implementation of the process at S1039, reference can be made to the process at S1036 of determining the first virtual input area on the target interaction area.

S10310, determining the second virtual input area as the input control area.

The implementation of the process at S10310 is the same as the implementation of the process at S1036 of determining the first virtual input area as the input control area. When implementation of the process at S10310, reference can be made to the process at S1036 of determining the first virtual input area as the input control area.

S10311, determining whether the preset strategy is to combine the first human-machine interaction area and the second human-machine interaction area.

When it is determined in the process at S102 that the preset strategy is to combine the first human-machine interaction area and the second human-machine interaction area, the process at S10312 may be performed to continue to operate on the first human-machine interaction area and the second human-machine interaction area. When it is determined in the process at S102 that the preset strategy is not to combine the first human-machine interaction area and the second human-machine interaction area, the process at S10314 may be performed, that is, the process may be ended.

S10312, determining the combined interaction area as the target interaction area.

S10313, determining the target area as the input control area.

The process at S10313 may be implemented in the following two methods.

In the first method, a fourth virtual input area may be determined on the target area, and the fourth virtual input area may be determined as the input control area.

For the implementation method of the first method, reference can be made to the implementation of the process at S1036. Since the target area in the first method is a combined target area with a relatively large area, the area of the fourth virtual input area in the first method may be larger than the area of the first virtual input area in the process at S1036, thereby improving the convenience of operation.

In the second method, one of the first human-machine interaction area and the second human-machine interaction area may be determined as the virtual keyboard area, and the other human-machine interaction area outside the virtual keyboard area may be determined as the virtual touchpad area. The fourth virtual input area may include the virtual keyboard area and the virtual touchpad area, and the fourth virtual input area may be determined as the input control area.

The fourth virtual input area may include the virtual keyboard area and the virtual touchpad area. The virtual keyboard area may be determined in the first human-machine interaction area (or the second human-machine interaction area), and the virtual touchpad area may be determined in another human-machine interaction area. In some embodiments, one touchpad area may be generated, and multiple touchpad areas with different touch precisions may also be generated. The touch precision may be a default value, or it may be set based on user-defined settings. When multiple touchpad areas are generated, the number of touchpads may be a default value, or it may be set based on user-defined settings.

S10314, end process.

Through the processes of S1031 to S10314, when the preset strategy is to disable the second human-machine interaction area, the first human-machine interaction area may be determined as the target area, and when the first human-machine interaction area includes the input control component, the area where the input control component is positioned may be determined as the input control area. When the first human-machine interaction area does not include the input control component, the first virtual input area may be determined as the target interaction area, and the first virtual input area may be determined as the input control area. When the preset strategy is to disable the first human-machine interaction area, the second human-machine interaction area may be determined as the target area, the second virtual input area may be determined on the target interaction area, and the second virtual input area may be determined as the input control area. When the preset strategy is to combine the first human-machine interaction area and the second human-machine interaction area to form a combine interaction area, the combine interaction area may be determined as the target area, the fourth virtual input area may be determined on the target interaction area, and the fourth virtual input area may be determined as the input control area. On one hand, the function of the human-machine interaction area can be disabled to prevent accidental touches. On the other hand, the area of the fourth virtual input area can be increased by combining the first human-machine interaction area and the second human-machine interaction area, thereby improving the convenience of operation.

Figure 6:
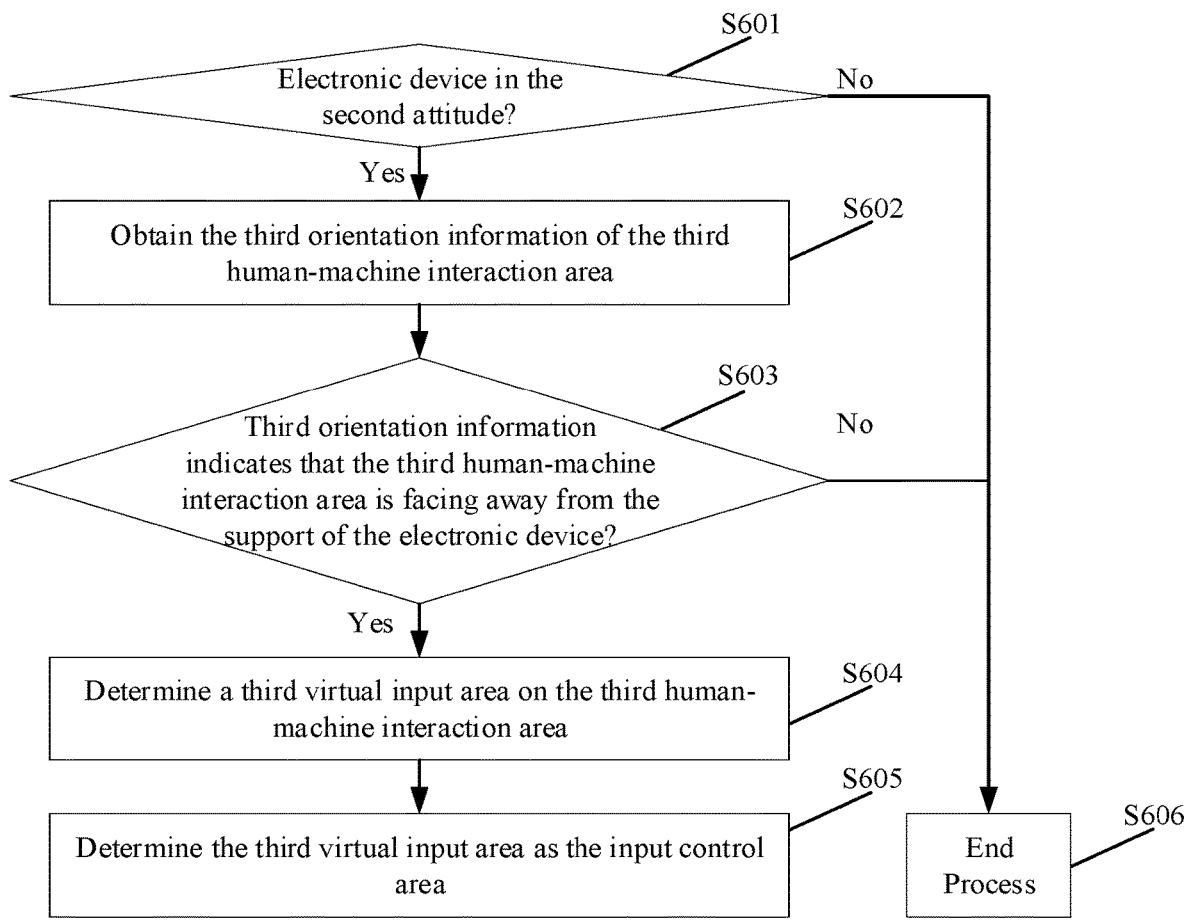
FIG. 6 is another flowchart of the control method according to an embodiment of the present disclosure.

In some embodiments, the electronic device may also include a third human-machine interaction area with a display touch function, and the third human-machine interaction area may be positioned on the back of the second human-machine interaction area. Take a notebook computer as an example. The third human-machine interaction area may be positioned on side A of the notebook computer. After the process at S101 is performed, as shown in FIG. 6, the following processes of S601 to S606 may be performed.

S601, determining whether the electronic device is in a second attitude.

In some embodiments, when the electronic device is in the second attitude, the first plane where the first human-machine interaction area is positioned and the second plane where the second human-machine interaction area is positioned may be forwardly snapped, such as the configuration shown in FIG. 2E.

In the embodiments of the present disclosure, the attitude information may still be obtained through the gravity sensor. When it is determined that the electronic device is in the second attitude based on the attitude information, the process at S602 may be performed to further obtain the orientation information of the third human-machine interaction area. When it is determined that the electronic device is not in the second attitude based on the attitude information, the process at S606 may be performed, that is, the process may be ended.

S602, obtaining third orientation information of the third human-machine interaction area.

In some embodiments, the third orientation information may include the orientation of the third human-machine interaction area. In the embodiments of the present disclosure, a gravity sensor may be installed in the third human-machine interaction area. The gravity sensor may be configured to obtain the orientation information of the third human-machine interaction area. Therefore, by reading the data in the gravity sensor, the third orientation information of the third preset strategy can be obtained.

S603, determining whether the third orientation information indicates that the third human-machine interaction area is facing away from the support of the electronic device.

When implementing the process at S603, the third orientation information may be orthogonally decomposed based on the horizontal and vertical directions. When the decomposed orientation information in the vertical direction is an upward direction, the third human-machine interaction area may be facing away from the support of the electronic device, and the process at S604 may be performed. When the decomposed orientation information in the vertical direction indicates a downward direction, the third human-machine interaction area may be facing the support of the electronic device, and the process at S606 may be performed, that is, the process may be ended.

S604, determining a third virtual input area on the third human-machine interaction area.

The implementation of the process at S604 is the same as the implementation of the process at S1036 of determining the first virtual input area on the target interaction area. When implementation of the process at S604, reference can be made to the process at S1036 of determining the first virtual input area on the target interaction area.

S605, determining the third virtual input area as the input control area.

The implementation of the process at S605 is the same as the implementation of the process at S1036 of determining the first virtual input area as the input control area. When implementation of the process at S605, reference can be made to the process at S1036 of determining the first virtual input area as the input control area.

S606, end process.

Through the processes of S601 to S606, when the third human-machine interaction area positioned on the back of the second human-machine interaction area has the touch display function, and the attitude information indicates that the electronic device is in a forwardly snapped second attitude, the third orientation information of the third human-machine interaction area may be obtained. When the third orientation information indicates that the third human-machine interaction area faces the support of the electronic device, a third virtual input area may be determined on the third human-machine interaction area, and the third virtual input area may be determined as the input control area to receive input operations, thereby improving the flexibility of the electronic device and increasing the function of the electronic device.

Based on the foregoing embodiments, an embodiment of the present disclosure further provides a control method, which can be applied to a notebook computer. At home or in the office, users often use notebook computers with external monitors to expand the size of the display screen and improve the display effect. There are generally three use cases.

Figure 7:
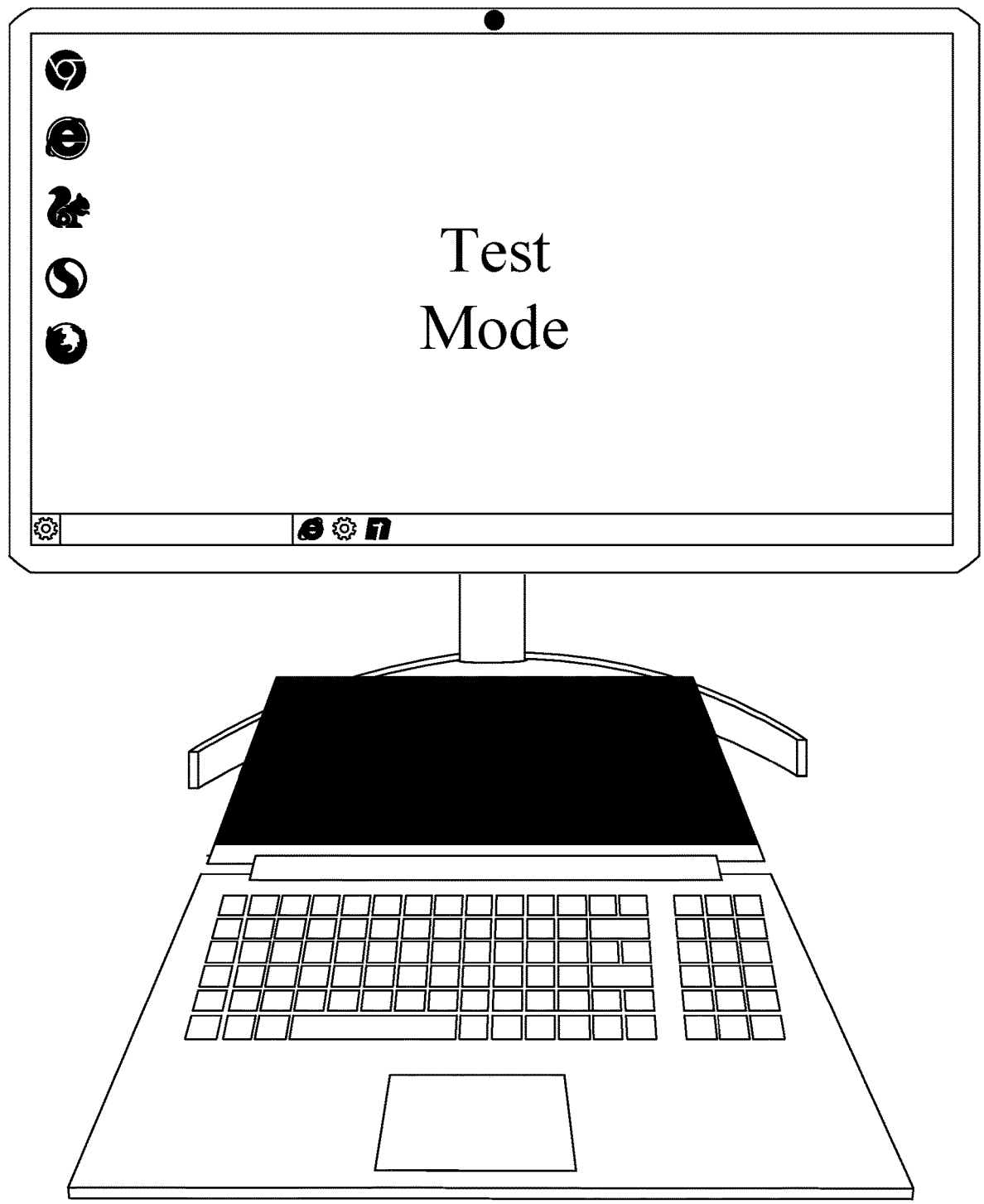
FIG. 7 is a schematic diagram of a notebook computer in a laid flat state when an external display device is connected in conventional technology.

In the first use case, as shown in FIG. 7, when the notebook computer is used with an external monitor, the notebook computer generally needs to be placed in a flat state, which will take up more office space.

Figure 8:
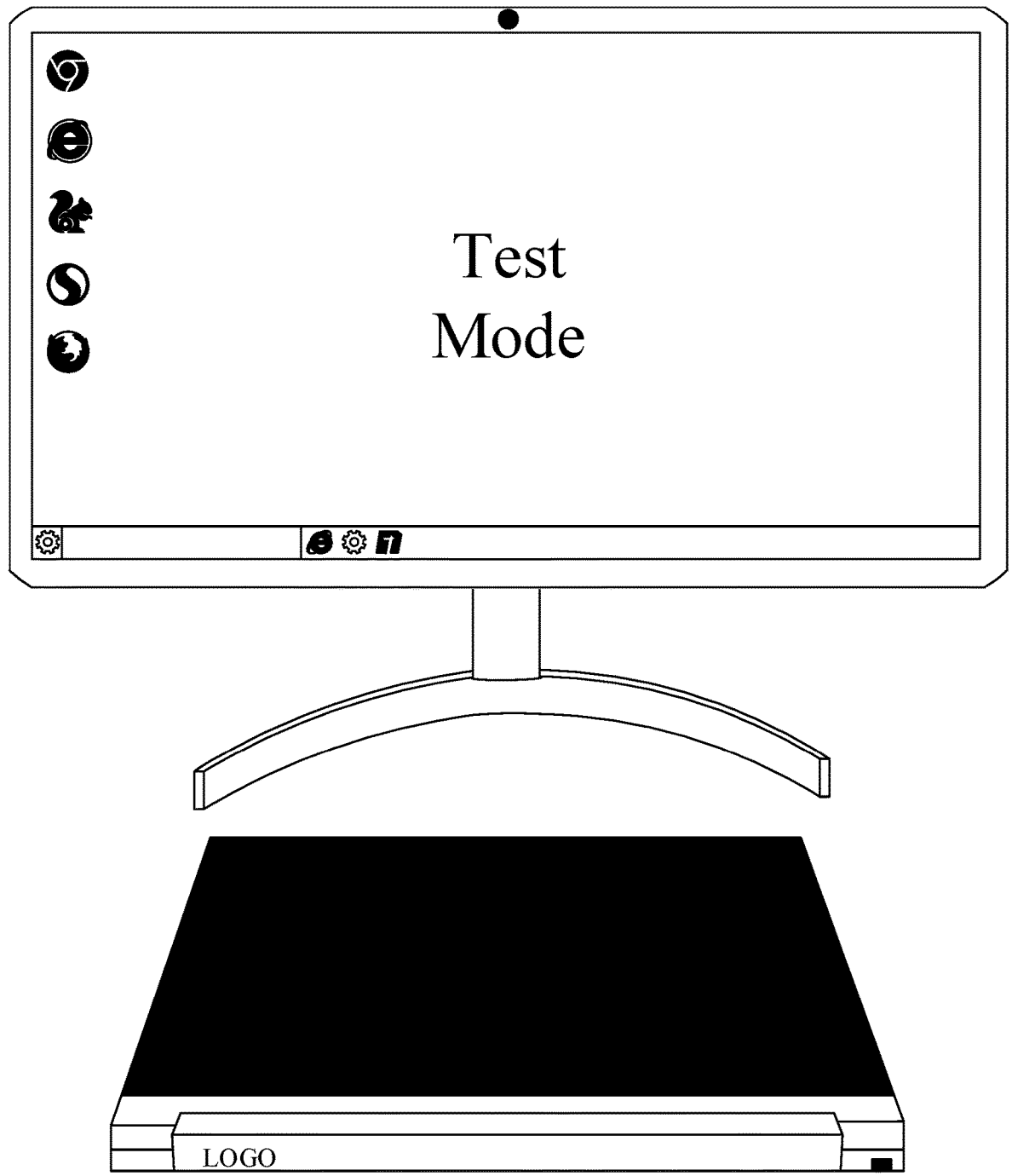
FIG. 8 is a schematic diagram of the notebook computer in a reverse snapped state when the external display device is connected in conventional technology.

In the second use case, as shown in FIG. 8, when the notebook computer is in the reversely snapped and the C-side faces the desktop, an external keyboard and mouse are required to use the external monitor.

Figure 9:
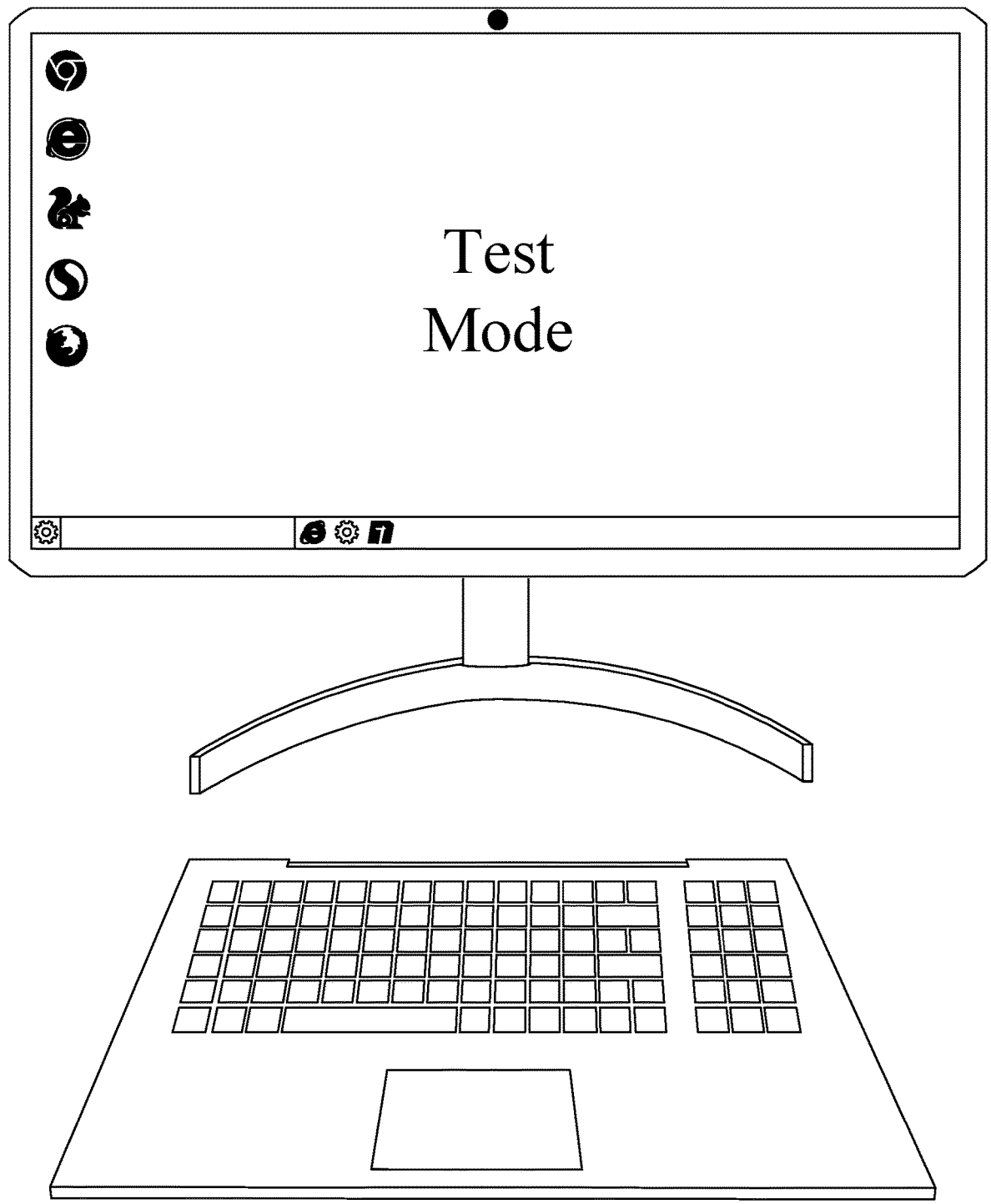
FIG. 9 is another schematic diagram of the notebook computer in the reverse snapped state when the external display device is connected in conventional technology.

In the third use case, as shown in FIG. 9, when the notebook computer is reversely snapped and the B-side is facing down, on one hand, since the angle between B-side and C-side is greater than a preset angle, which may be 180°, 200°, etc., the notebook computer may change to the tablet mode. That is, the keyboard and the touchpad in the C-side may be set to an off state, therefore, an external keyboard and mouse are needed to use the external monitor. On the other hand, at this time, the function of the B-side is still in an on state. For the B-side with the touch display function, it is very easy to accidentally touch B-side, thereby affecting the normal use of the notebook computer.

Based on the three situations described above, when the notebook computer is used with an external monitor, external keyboard and mouse are needed, which occupies workstation resources, and the B-side is easily mis-operated.

Figure 10:
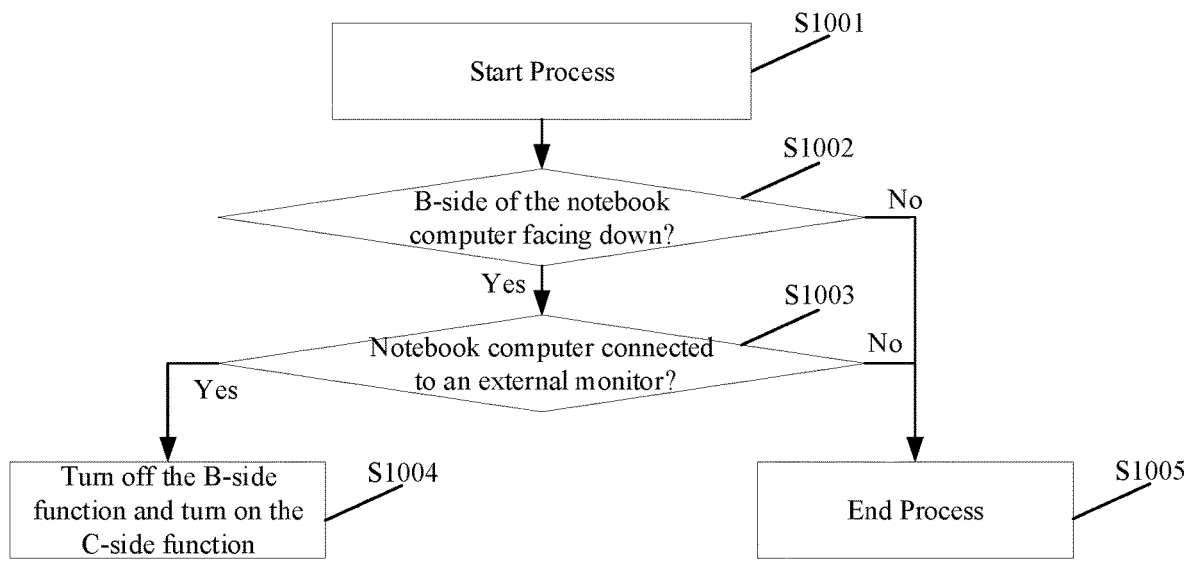
FIG. 10 is another flowchart of the control method according to an embodiment of the present disclosure.

As shown in FIG. 10, the control method provided by the embodiments of the present disclosure may be implemented through the processes of S1001 to S1005.

S1001, start process.

The process may be started by dialing a physical button, using a voice command, and entering program codes.

S1002, determining whether the B-side of the notebook computer is facing down.

The attitude information of the B-side may be obtained through the gravity sensor installed in the B-side of the notebook computer, and based on the attitude information, whether the B-side is facing down can be determined. When the B-side is facing down, the process at S1003 may be performed to continue to determine whether the notebook computer has an external monitor. When the B-side is not facing down, the process at S1005 may be performed, that is, the process can be ended.

S1003, determining whether the notebook computer is connected to an external monitor.

Whether the notebook computer is connected to an external monitor may be determined through the interface state of the VGA, HDMI, or USB interface of the notebook computer. When the notebook computer is connected to an external monitor, the process at S1004 may be performed to turn off the function of the B-side and turn on the function of the C-side. When the notebook computer is not connected to an external monitor, the process at S1005 may be performed, that is, the process can be ended.

S1004, turning off the function of the B-side and turning on the function of the C-side.

When the process at S1004 is implemented, the touch function of the B-side may be turned off through the EC control of the notebook computer, and the function of the C-side may be turned on through the EC control of the notebook computer. The function of the C-side may include turning on the keyboard and touchpad functions on the C-side.

S1005, end process.

Through the processes of S1001 to S1005, whether the B-side of the notebook computer is facing down can be first determined. When the B-side is facing down, whether the notebook computer is connected to an external monitor can be determined. When the notebook computer is connected to an external monitor, the touch function on the B-side can be turned off through the EC control, and the keyboard and touchpad functions on the C-side can be turned on through the EC control. In this way, there is no need for an external keyboard and mouse, thereby saving workstation resources, and avoiding mis-operation on the B-side.

Based on the foregoing embodiments, an embodiment of the present disclosure provides a control device. The modules included in the control device and the units included in each module may be implemented by a processor in a computer device. Of course, the modules included in the control device and the units included in each module may also be implemented by specific logic circuits. In the implementation process, the processor can be a central processing unit (CPU), a microprocessor (MPU), a digital signal processor (DSP), or a field programmable gate array (FPGA), etc.

Figure 11:
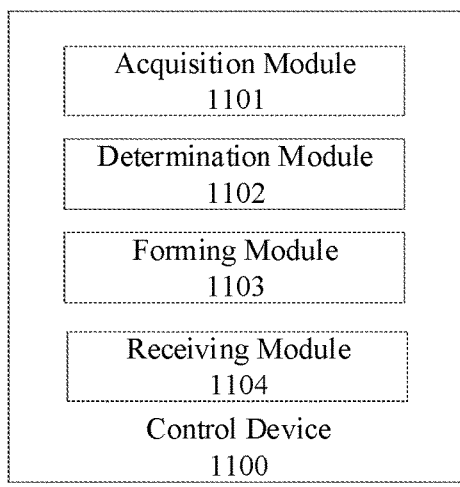
FIG. 11 is a structural diagram of a control device according to an embodiment of the present disclosure.

An embodiment of the present disclosure further provides a control device. FIG. 11 is a structural diagram of a control device 1100 according to an embodiment of the present disclosure. As shown in FIG. 11, the control device 1100 includes an acquisition module 1101, configured to obtain attitude information of the electronic device when it is determined that the electronic device is connected to an external display device, and a determination module 1102, configured to determine the corresponding preset strategy based on the attitude information. In some embodiments, the preset strategy may be one of the strategies of disabling a first function of the first human-machine interaction area, disabling a second function of the second human-machine interaction area, and combining the first human-machine interaction area and the second human-machine interaction area. The control device 1100 further includes a forming module 1103, configured to form a target interaction area based on the preset strategy, and determine the target interaction area as an input control area; and a receiving module 1104, configured to receive input operations through the input control area.

In some embodiments, the determination module 1102 may be further configured to obtain the first orientation information of the first human-machine interaction area and the second orientation information of the second human-machine interaction area when it is determined that the electronic device is in the first attitude based on the attitude information. In some embodiments, when the electronic device is in the first attitude, a first plane where the first human-machine interaction area is positioned may be reversely snapped with a second plane where the second human-machine interaction area is positioned. The determination module 1102 may be configured to determine the human-machine interaction area facing the support of the electronic device in the first human-machine interaction area and the second human-machine interaction area based on the first orientation information and the second orientation information, and determine that the preset strategy is to disable the function of the human-machine interaction area facing the support of the electronic device.

In some embodiments, the second human-machine interaction area may include a touch function, and the determination module 1102 may include a first disabling unit, configured to disable the second function of the second human-machine interaction area when the human-machine interaction area facing the support of the electronic device is the second human-machine interaction area. The forming module 1103 may include a first determination unit, configured to determine the first human-machine interaction area as the target area; an acquisition unit, configured to obtain the first attribute information of the target interaction area; a second determination unit, configured to determine the first virtual input area on the target interaction area and determine the first virtual input area as the input control area when the first attribute information indicates that the target interaction area is a touch display area and does not include an input control component; and a third determination unit, configured to determine the area where the input control component is positioned as the input control area when the first attribute information indicates that the target interaction area includes the input control component.

In some embodiments, the second human-machine interaction area may include a display touch function, and the determination module 1102 may further include a second disabling unit, configured to disable the first function of the first human-machine interaction area when the human-machine interaction area facing the support of the electronic device is the first human-machine interaction area. The forming module 1103 may further include a fourth determination unit, configured to determine the second human-machine interaction area as the target area; a fifth determination unit, configured to determine the second virtual input area on the target interaction area; and a sixth determination unit, configured to determine the second virtual input area as the input control area.

In some embodiments, the electronic device may further include a third human-machine interaction area with display touch function. The third human-machine interaction area may be positioned on the back of the second human-machine interaction area. The acquisition module 1101 may be further configured to obtain the third orientation information of the third human-machine interaction area when it is determined that the electronic device is in the second attitude based on the attitude information. In some embodiments, when the electronic device is in the second attitude, the first plane where the first human-machine interaction area is positioned and the second plane where the second human-machine interaction area is positioned may be forwardly snapped. The acquisition module 1101 may be further configured to determine the third virtual input area on the third human-machine interaction area when the third orientation information indicates that the third human-machine interaction area is facing away from the support of the electronic device, and determine the third virtual input area as the input control area.

In some embodiments, the first human-machine interaction area and the second human-machine interaction area may both be touch display screens, and the determination module 1102 may further include a forming unit, configured to determine that the preset strategy is to combine the first human-machine interaction area and the second human-machine interaction area to form a combined interaction area when it is determined that the electronic device is in the third attitude based on the attitude information.

In some embodiments, when the electronic device is in the third attitude, the first plane where the first human-machine interaction area is positioned may be on the same plane as the second plane where the second human-machine interaction area is positioned, and both the first plane and the second plane may face away from the support of the electronic device.

In some embodiments, the forming module 1103 may further include a seventh determination unit, configured to determine the combined interaction area as the target interaction area; and an eighth determination unit, configured to determine the target area as the input control area.

In some embodiments, the forming module 1103 may further include a ninth determination unit, configured to determine the fourth virtual input area on the target area, and determine the fourth virtual input area as the input control area; or a tenth determination unit, configured to determine one of the first human-machine interaction area and the second human-machine interaction area as the virtual keyboard area, determine another human-machine interaction area outside the virtual keyboard area as the virtual touchpad area, the fourth virtual input area including the virtual keyboard area and the virtual touchpad area, and determine the fourth virtual input area as the input control area.

In some embodiments, the acquisition module 1101 may be further configured to obtain the first attribute information of the first human-machine interaction area and the second attribute information of the second human-machine interaction area when it is determined that the electronic device is connected to an eternal input control device; receive the input operation through the input control device when the first attribute information indicates that the first human-machine interaction area does not include the input control component, and the second attribute information indicates that the second human-machine interaction area does not include an input component; and control the electronic device based on the input operation.

In some embodiments, the first human-machine interaction area and the second human-machine interaction area may rotate within an angle threshold. In some embodiments, the electronic device may be a notebook computer, the first human-machine interaction area may be positioned on the C-side of the notebook computer, and the second human-machine interaction area may be positioned on the B-side of the notebook computer.

It should be noted that, software functional modules for implementing a method consistent with the disclosure can be stored in a non-transitory computer-readable storage medium. Thus, part or all of the technical solutions consistent with the disclosure can be implemented as computer software product stored in a storage medium. The software product may include instructions that can cause computer equipment, such as a personal computer, a server, or network equipment, to perform part or all of a method consistent with the disclosure. The storage medium can include a medium that can store program codes, such as a mobile storage, a ROM, a diskette, or a compact disc. In this way, the embodiments of the present disclosure are not limited to any specific combination of hardware and software.

Correspondingly, an embodiment of the present disclosure provides a computer-readable storage medium having a computer program stored thereon. When the computer program is executed by a processor, the processes in the control method described in the foregoing embodiments can be implemented.

Figure 12:
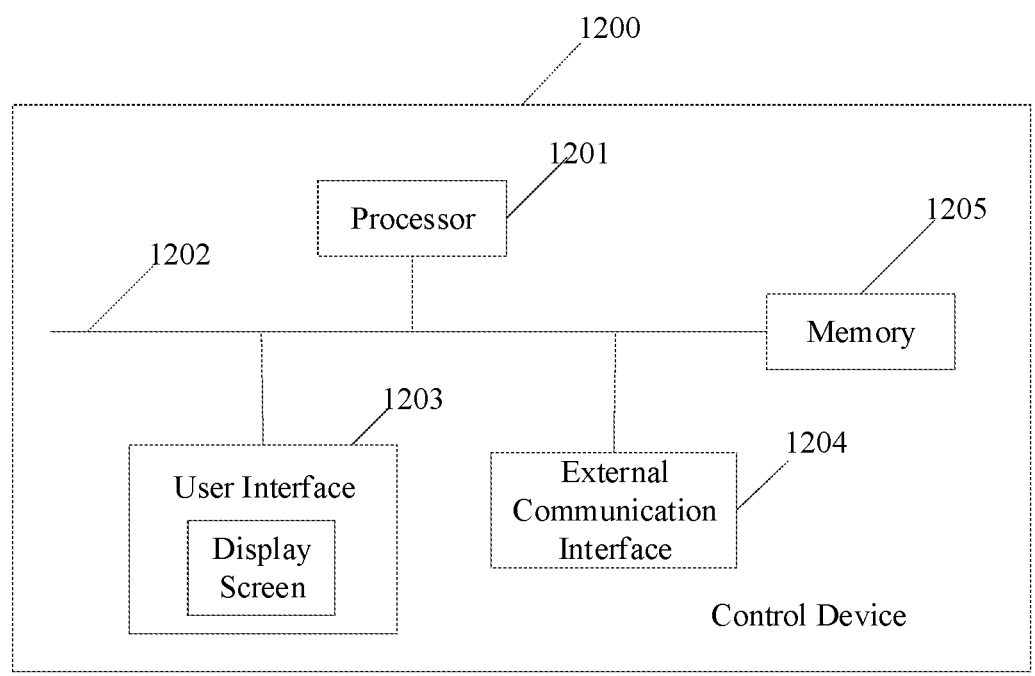
FIG. 12 is a structural diagram of the electronic device according to an embodiment of the present disclosure.

An embodiment of the present disclosure provides an electronic device. FIG. 12 is a structural diagram of the electronic device 1200 according to an embodiment of the present disclosure. As shown in FIG. 12, the electronic device 1200 includes a processor 1201, at least one communication bus 1202, a user interface 1203, at least one external communication interface 1204, and a memory 1205. In some embodiments, the communication bus 1202 may be configured to implement the connections and communications between these components. The user interface 1203 may include a display screen, and the external communication interface 1204 may include a standard wired interface and a wireless interface. The processor 1201 may be configured to execute the program of the control method stored in the memory, thereby implementing the processes in the control method provided in the foregoing embodiments.

It is to be noted here that the descriptions of the above electronic device and storage medium embodiments are similar to the description of the above method embodiments. The electronic device and storage medium embodiments have similar advantageous effects with those of the method embodiments and thus the description thereof will be omitted here. For those technical details not mentioned in the above electronic device and storage medium embodiments, reference can be made to the description of the above method embodiments and the description thereof will be omitted here for simplicity.

In the disclosure, the term "an embodiment" may include relevant features, structures, or characteristics that are not explicitly mentioned or described. Reference to, e.g., "an embodiment," "the embodiment," or "some embodiments," does not necessarily mean the same embodiment or embodiments. The features, structures, or characteristics can be combined as appropriate in one or more embodiments. The reference numerals used in the disclosure do not indicate or imply any particular sequence or order for executing the disclosed processes. The order of the processes should be determined based on their functions and internal logics.

Further, terms "include" and "comprise," and any other alternative forms of such terms, used in the disclosure intend to be nonexclusive. That is, a process, method, article, or device described as including certain elements does not only include the elements that are explicitly listed, but may also include other elements that are not explicitly listed or elements that are inherent to the process, method, article, or device. Other than being explicitly specified, an element following the phrase "including a" does not exclude the existence of another same element in the process, method, article, or device that includes the element.

The disclosed devices and methods can be implemented in other manners. The above-described servers and devices are merely examples. For example, different units may be defined merely according to their logical functions and can be defined according to a different manner. For example, multiple units or components can be combined or integrated into another system, or some features can be omitted or not executed. Further, the coupling, direct coupling, or communication connection between various components can be implemented by interfaces. The indirect coupling or communication connection between various devices or units can be electrical, mechanical, or another form.

Units described as separate components may or may not be physically separated from each other. A component described or shown as a unit play or may not be a physical unit. The units can be located in a same place or distributed on multiple network units. Some or all of the units can be chosen to accomplish the objectives of the disclosure according to actual need.

Further, various functional units can be all integrated in one processing unit or be separate, individual units. Two or more units can be integrated in one unit. A unit can be implemented by hardware or by a combination of hardware and software.

It is understood by persons of ordinary skill in the art that all or some of the processes consistent with the disclosure can be implemented by hardware as instructed by a program, which can be stored in a non-transitory computer-readable storage medium. The program, when executed, can cause, for example, a processor to perform a method consistent with the disclosure, such as one of the examples of the methods described above. The storage medium can include a medium that can store program codes, such as a mobile storage, a read only memory (ROM), a diskette, or a compact disc.

Further, software functional modules for implementing a method consistent with the disclosure can be stored in a non-transitory computer-readable storage medium. Thus, part or all of the technical solutions consistent with the disclosure can be implemented as computer software product stored in a storage medium. The software product may include instructions that can cause computer equipment, such as a personal computer, a server, or network equipment, to perform part or all of a method consistent with the disclosure. The storage medium can include a medium that can store program codes, such as a mobile storage, a ROM, a diskette, or a compact disc.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A control method applied to an electronic device, the electronic device including at least a first human-machine interaction area and a second human-machine interaction area, the first human-machine interaction area and the second human-machine interaction area being movable relative to each other, the method comprising:
    obtaining attitude information of the electronic device in response to determining that the electronic device is connected to an external display device, the attitude information including orientation of the first human-machine interaction area and/or orientation of the second human-machine interaction area;
    determining a corresponding strategy based on the attitude information, the strategy including one of disabling a first function of the first human-machine interaction area, disabling a second function of the second human-machine interaction area, and combining the first human-machine interaction area and the second human-machine interaction area;
    determining a target interaction area based on the strategy, and identifying the target interaction area as an input control area; and
    receiving an input operation through the input control area.

2. The method of claim 1, wherein determining the corresponding strategy based on the attitude information includes:
    obtaining first orientation information of the first human-machine interaction area and second orientation information of the second human-machine interaction area in response to determining that the electronic device is in a first attitude, a first plane where the first human-machine interaction area is positioned and a second plane where the second human-machine interaction area is positioned being reversely snapped when the electronic device is in the first attitude;
    determining the human-machine interaction area facing a support of the electronic device in the first human-machine interaction area and the second human-machine interaction area based on the first orientation information and the second orientation information; and
    determining that the strategy is to disable the function of the human-machine interaction area facing the support of the electronic device.

3. The method of claim 2, wherein:
the second human-machine interaction area includes a touch function;
determining that the strategy is to disable the function of the human-machine interaction area facing the support of the electronic device includes:
    disabling the second function of the second human-machine interaction area when the human-machine interaction area facing the support of the electronic device is the second human-machine interaction area; and
determining the target interaction area based on the strategy, and identifying the target interaction area as the input control area includes:
    determining the first human-machine interaction area as the target interaction area;
    obtaining first attribute information of the target interaction area;
    determining a first virtual input area on the target interaction area, and determining the first virtual input area as the input control area when the first attribute information indicates that the target interaction area is a touch display area and does not include the input control component; and
    determining the area where the input control component is positioned as the input control area when the first attribute information indicates that the target interaction area includes the input control component.

4. The method of claim 2, wherein;
the second human-machine interaction area includes a touch function;
determining that the strategy is to disable the function of the human-machine interaction area facing the support of the electronic device includes:
    disabling the first function of the first human-machine interaction area when the human-machine interaction area facing the support of the electronic device is the first human-machine interaction area; and
determining the target interaction area based on the strategy, and identifying the target interaction area as the input control area includes:
    determining the second human-machine interaction area as the target interaction area;
    determining a second virtual input area on the target interaction area; and
    determining the second virtual input area as the input control area.

5. The method of claim 1, further comprising:
obtaining third orientation information of a third human-machine interaction area of the electronic device, the third human-machine interaction area having a touch display function, the third human-machine interaction area being positioned behind the second human-machine interaction area, wherein the first plane where the first human-machine interaction area is positioned and the second plane where the second human-machine interaction area is positioned are forwardly snapped when the electronic device is in a second attitude;
determining a third virtual input area on the third human-machine interaction area when the third orientation information indicates that the third human-machine interaction area is facing away from the support of the electronic device; and determining the third virtual input area as the input control area.

6. The method of claim 1, wherein:
the first human-machine interaction area and the second human-machine interaction area are both touch control display screens;
determining the corresponding strategy based on the attitude information includes:
determining that the strategy is to combine the first human-machine interaction area and the second human-machine interaction area to form a combined interaction area in response to determining that the electronic device is in a third attitude based on the attitude information, wherein when the electronic device is in the third attitude, the first plane where the first human-machine interaction area is position is on the same plane as the second plane of the second human-machine interaction area, and the first plane and the second plane both face away from the support of the electronic device; and
determining the target interaction area based on the strategy, and identifying the target interaction area as the input control area includes:
determining the combined interaction area as the target interaction area; and
determining the target interaction area as the input control area.

7. The method of claim 6, wherein determining the target interaction area as the input control area includes:
determining a fourth virtual input area on the target interaction area, and determining the fourth virtual input area as the input control area; or
determining one of the first human-machine interaction area and the second human-machine interaction area as a virtual keyboard area, and determining the other human-machine interaction area outside the virtual keyboard area as a virtual touchpad area, the fourth virtual input area including the virtual keyboard area and the virtual touchpad area; and determining the fourth virtual input area as the input control area.

8. The method of claim 1, further comprising:
obtaining the first attribute information of the first human-machine interaction area and second attribute information of the second human-machine interaction area in response to determining that the electronic device is connected to an external input control device;
receiving the input operation through the input control device in response to the first attribute information indicating that the first human-machine interaction area does not include an input component, and the second attribute information indicating that the second human-machine interaction area does not include the input component; and
controlling the electronic device based on the input operation.

9. The method of claim 1, wherein:
the first human-machine interaction area and the second human-machine interaction area are configured to rotate within an angle threshold, and the electronic device is a notebook computer, the first human-machine interaction area being positioned on a C-side of the notebook computer, the second human-machine interaction area being positioned on a B-side of the notebook computer.

10. An electronic device including at least a first human-machine interaction area and a second human-machine interaction area, the first human-machine interaction area and the second human-machine interaction area being movable relative to each other, comprising:
a processor; and
a memory storing program instructions that, when being executed by the processor, cause the processor to:
obtain attitude information of the electronic device in response to determining that the electronic device is connected to an external display device, the attitude information including orientation of the first human-machine interaction area and/or orientation of the second human-machine interaction area;
determine a corresponding strategy based on the attitude information, the strategy including one of disabling a first function of the first human-machine interaction area, disabling a second function of the second human-machine interaction area, and combining the first human-machine interaction area and the second human-machine interaction area;
determine a target interaction area based on the strategy, and identify the target interaction area as an input control area; and
receive an input operation through the input control area.

11. The electronic device of claim 10, wherein:
the first human-machine interaction area and the second human-machine interaction area are configured to rotate within an angle threshold, and the electronic device is a notebook computer, the first human-machine interaction area being positioned on a C-side of the notebook computer, the second human-machine interaction area being positioned on a B-side of the notebook computer.

12. A non-transitory computer-readable storage medium storing program instructions that, when being executed by a processor, cause the processor to:
obtain attitude information of an electronic device in response to determining that the electronic device is connected to an external display device, the attitude information including orientation of the first human-machine interaction area and orientation of the second human-machine interaction area;
determine a corresponding strategy based on the attitude information, the strategy including one of disabling a first function of the first human-machine interaction area, disabling a second function of the second human-machine interaction area, and combining the first human-machine interaction area and the second human-machine interaction area;
determine a target interaction area based on the strategy, and identify the target interaction area as an input control area; and
receive an input operation through the input control area.

13. The non-transitory computer-readable storage medium of claim 12, wherein the program instructions further cause the processor to:
obtain first orientation information of the first human-machine interaction area and second orientation information of the second human-machine interaction area in response to determining that the electronic device is in a first attitude, a first plane where the first human-machine interaction area is positioned and a second plane where the second human-machine interaction area is positioned being reversely snapped when the electronic device is in the first attitude;
determine the human-machine interaction area facing a support of the electronic device in the first human-machine interaction area and the second human-machine interaction area based on the first orientation information and the second orientation information; and determine that the strategy is to disable the function of the human-machine interaction area facing the support of the electronic device.

14. The non-transitory computer-readable storage medium of claim 13, wherein the program instructions further cause the processor to:
disable the second function of the second human-machine interaction area when the human-machine interaction area facing the support of the electronic device is the second human-machine interaction area;
determine the first human-machine interaction area as the target interaction area;
obtain first attribute information of the target interaction area;
determine a first virtual input area on the target interaction area, and determining the first virtual input area as the input control area when the first attribute information indicates that the target interaction area is a touch display area and does not include the input control component; and
determine the area where the input control component is positioned as the input control area when the first attribute information indicates that the target interaction area includes the input control component.

15. The non-transitory computer-readable storage medium of claim 14, wherein the program instructions further cause the processor to:
disable the first function of the first human-machine interaction area when the human-machine interaction area facing the support of the electronic device is the first human-machine interaction area;
determine the second human-machine interaction area as the target interaction area;
determine a second virtual input area on the target interaction area; and
determine the second virtual input area as the input control area.

16. The non-transitory computer-readable storage medium of claim 12, wherein the program instructions further cause the processor to:
obtain third orientation information of a third human-machine interaction area of the electronic device, the third human-machine interaction area having a touch display function, the third human-machine interaction area being positioned behind the second human-machine interaction area, wherein the first plane where the first human-machine interaction area is positioned and the second plane where the second human-machine interaction area is positioned are forwardly snapped when the electronic device is in a second attitude;
determine a third virtual input area on the third human-machine interaction area when the third orientation information indicates that the third human-machine interaction area is facing away from the support of the electronic device; and
determine the third virtual input area as the input control area.

17. The non-transitory computer-readable storage medium of claim 12, wherein the program instructions further cause the processor to:
determine that the strategy is to combine the first human-machine interaction area and the second human-machine interaction area to form a combined interaction area in response to determining that the electronic device is in a third attitude based on the attitude information, wherein when the electronic device is in the third attitude, the first plane where the first human-machine interaction area is position is on the same plane as the second plane of the second human-machine interaction area, and the first plane and the second plane both face away from the support of the electronic device;
determine the combined interaction area as the target interaction area; and
determine the target interaction area as the input control area.

18. The non-transitory computer-readable storage medium of claim 17, wherein the program instructions further cause the processor to:
determine a fourth virtual input area on the target interaction area, and determining the fourth virtual input area as the input control area; or
determine one of the first human-machine interaction area and the second human-machine interaction area as a virtual keyboard area, and determining the other human-machine interaction area outside the virtual keyboard area as a virtual touchpad area, the fourth virtual input area including the virtual keyboard area and the virtual touchpad area; and determining the fourth virtual input area as the input control area.

19. The non-transitory computer-readable storage medium of claim 12, wherein the program instructions further cause the processor to:
obtain the first attribute information of the first human-machine interaction area and second attribute information of the second human-machine interaction area in response to determining that the electronic device is connected to an external input control device;
receive the input operation through the input control device in response to the first attribute information indicating that the first human-machine interaction area does not include an input component, and the second attribute information indicating that the second human-machine interaction area does not include the input component; and
control the electronic device based on the input operation.

20. The non-transitory computer-readable storage medium of claim 12, wherein:
the first human-machine interaction area and the second human-machine interaction area are configured to rotate within an angle threshold, and the electronic device is a notebook computer, the first human-machine interaction area being positioned on a C-side of the notebook computer, the second human-machine interaction area being positioned on a B-side of the notebook computer.

* * * * *